United States Patent Office 2,777,754
Patented Jan. 15, 1957

2,777,754

PURIFICATION OF ANHYDROUS HYDROGEN FLUORIDE

Viktor Weinmayr, Pitman, N. J., assignor to E. I. du Pont de Nemours and Company, Wilmington, Del., a corporation of Delaware No Drawing. Application July 13, 1951,
Serial No. 236,684

6 Claims. (Cl. 23—153)

This invention relates to a process for the purification of anhydrous hydrogen fluoride and particularly to the removal of sulfur dioxide from technical anhydrous hydrogen fluoride.

Commercial anhydrous hydrogen fluoride as made from fluorspar with sulfuric acid always contains some sulfur dioxide. In the better grades of acid the sulfur dioxide content may be as low as 0.1% by weight, and in poorer grades it may be as high as 1% by weight or more. The presence of as little as 0.1% sulfur dioxide in anhydrous hydrogen fluoride is undesirable for many purposes. When the hydrogen fluoride is used in alkalations, undesirable sulfur-containing products may be formed. Corrosion produced by the hydrogen fluoride becomes more pronounced in the presence of sulfur dioxide. The presence of sulfur dioxide is especially undesirable when the hydrogen fluoride is to be used as a reaction medium in which catalytic hydrogenations are to be carried out. In such cases, it becomes imperative that the sulfur dioxide be converted to compounds which do not act as catalyst poisons or which can easily be separated from the hydrogen fluoride.

It has been proposed to remove sulfur dioxide from hydrogen fluoride by fractional distillation. While such a procedure is feasible, it is expensive and requires very efficient fractionating equipment. This method is particularly undesirable when intermittent small batches are required.

In United States Patent No. 2,414,884 there is described a method by which sulfur dioxide in anhydrous hydrogen fluoride is reduced to sulfur, using hydrogen sulfide as the reducing agent. The sulfur is then removed by filtration or is left behind as a residue when the thus purified hydrogen fluoride is distilled. However, by this method an additional catalyst poison (hydrogen sulfide) is introduced in the hydrogen fluoride and its careful separation becomes necessary.

It has been proposed in United States Patent No. 2,526,585 to convert the sulfur dioxide and other sulfur compounds in anhydrous hydrogen fluoride to sulfuryl fluoride and sulfur hexafluoride by the use of silver difluoride or cobalt trifluoride. These agents are expensive, because they require elemental fluorine in their manufacture. Furthermore, they are difficult and troublesome to handle since they react with moisture in the air.

It is an object of this invention to provide an inexpensive and efficient method of removing sulfur dioxide from anhydrous hydrogen fluoride. A further object is to provide a method of converting sulfur dioxide in anhydrous hydrogen fluoride to other sulfur-containing compounds which do not act as catalyst poisons. A further object is to provide a process of this sort which does not require elaborate equipment.

These objects are achieved by the process of this invention which comprises contacting anhydrous hydrogen fluoride containing a small amount of sulfur dioxide as an impurity with an inorganic oxidizing agent selected from the group consisting of manganese dioxide, potassium permanganate and the chlorates, chromates, dichromates and peroxides of sodium and potassium. The reaction is carried out in the liquid phase, using an amount of the oxidizing agent which is at least stoichiometrically equivalent to the sulfur dioxide originally present in the hydrogen fluoride. Anhydrous hydrogen fluoride containing up to 1% sulfur dioxide can be purified by this process to such an extent that no sulfur dioxide can be detected in the purified product.

The purification is conducted in the liquid phase at a temperature between 20° and 200° C. The pressure is maintained at a high enough level to keep at least part of the hydrogen fluoride liquid, and may be substantially higher, although there is no particular advantage in the use of high pressures. In most cases it will be convenient to carry out the reaction at a temperature between 20° and about 80° C. Although the rate of inorganic reactions is not ordinarily a function of the temperature, the speed of the present reaction is favored by increase in temperature, since most of the oxidizing agents are not soluble in liquid hydrogen fluoride. Faster reaction is obtainable in such cases by the use of agitation. Oxidation of the sulfur dioxide may be complete within as little as ten minutes or may require as long as eight hours, depending upon a number of factors such as the temperature, the amount of sulfur dioxide present, the nature and degree of subdivision of the oxidizing agent, and the amount of agitation.

The present process is disclosed in copending applications Serial No. 222,157 and Serial No. 222,158, both filed April 20, 1951 and both having matured into U. S. Patents 2,714,614 and 2,666,791, respectively.

In order to obtain complete removal of the sulfur dioxide, it is necessary to use at least a stoichiometrically equivalent amount of oxidizing agent. An excess of the oxidant does no harm except where the treated hydrogen fluoride is to be used without further purification in a subsequent reaction where the oxidizing agent would interfere.

While the exact nature of the reaction which occurs is not known, it is believed that the sulfur dioxide is oxidized to sulfur trioxide which then reacts with hydrogen fluoride to give fluorsulfonic acid. This latter acid does not act as a catalyst poison, is in itself less corrosive than hydrogen fluoride and can easily be separated from hydrogen fluoride by distillation. Hydrogen fluoride boils at 20° C. while fluorsulfonic acid boils at 163° C.

Certain mild oxidizing agents such as sodium perborate and potassium ferricyanide have been found to be ineffective in this reaction. Exposure of the hydrogen fluoride in the vapor phase to the oxidizing agent in powdered or granulated form does not produce the desired oxidation of the sulfur dioxide.

The invention is illustrated by the following examples:

Example 1

An iron autoclave is charged with 37 parts of technical anhydrous hydrogen fluoride analyzing about 0.7% sulfur dioxide as determined iodometrically. Two parts of manganese dioxide are added and the charge is heated with agitation to 80° C. for eight hours. At this temperature, a pressure of 98 lbs. is recorded. After that time, the hydrogen fluoride is distilled into steel cylinders and is recovered with a yield of better than 95%. A sample shows the complete absence of sulfur dioxide or any other substance that liberates iodine in the iodometric analysis.

Example 2

A charge of 120 parts of technical anhydrous hydrogen fluoride analyzing 0.256% sulfur dioxide is treated in a steel shaker bomb with 0.7 part of sodium dichromate at 80° C. for four hours. No more sulfur dioxide can be detected in the reaction mass and the hydrogen fluoride is suitable as a solvent for hydrogenations without distillation.

*Example 3*

Hydrogen fluoride containing 0.5% of sulfur dioxide is treated with potassium permanganate in an amount corresponding to two moles of permanganate per mole of sulfur dioxide under reflux at the boiling point of hydrogen fluoride for one hour. Upon distillation, hydrogen fluoride free of sulfur dioxide is obtained.

*Example 4*

A charge of 75 parts of technical anhydrous hydrogen fluoride containing 0.285% $SO_2$ and 0.5 part of potassium chlorate is heated with agitation to 80° C. for four hours. The hydrogen fluoride is then suitable as a solvent for hydrogenations, being free from sulfur dioxide.

The process of this invention is particularly useful in the purification of small batches of anhydrous hydrogen fluoride, since no special fractionating equipment is required. For many purposes, the hydrogen fluoride which has been treated with the oxidizing agent may be used without removal of the excess agent or of the oxidation products formed from the sulfur dioxide. The hydrogen fluoride may be readily further purified by a simple distillation, resulting in a product substantially free from sulfur dioxide or other sulfur compounds. This process can be made an integral part of the manufacture of technical anhydrous hydrogen fluoride by adding oxidizing agents to the sulfuric acid used in the manufacture of hydrogen fluoride from fluorspar. The oxidizing agent may also be added to cylinders or other storage vessels containing anhydrous hydrogen fluoride so as to convert the sulfur dioxide to an inert form during storage.

I claim:

1. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an inorganic oxidizing agent selected from the group consisting of manganese dioxide, potassium permanganate and the chlorates, chromates, dichromates and peroxides of sodium and potassium, the amount of oxidizing agent being at least stoichiometrically equivalent to the amount of sulfur dioxide originally present in the hydrogen fluoride, until the sulfur dioxide is completely oxidized.

2. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an amount of manganese dioxide at least stoichiometrically equivalent to the amount of sulfur dioxide originally present in the hydrogen fluoride, until the sulfur dioxide is completely oxidized.

3. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an amount of potassium permanganate at least stoichiometrically equivalent to the amount of sulfur dioxide originally present in the hydrogen fluoride, until the sulfur dioxide is completely oxidized.

4. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an inorganic oxidizing agent selected from the group consisting of manganese dioxide, potassium permanganate and the chlorates, chromates, dichromates and peroxides of sodium and potassium, the amount of oxidizing agent being at least stoichiometrically equivalent to the amount of sulfur dioxide originally present in the hydrogen fluoride, until the sulfur dioxide is completely oxidized, and thereafter distilling the mixture to obtain hydrogen fluoride free from sulfur dioxide.

5. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an amount of manganese dioxide at least stoichiometrically equivalent to the amount of sulfur dioxide originally present in the hydrogen fluoride, until the sulfur dioxide is completely oxidized, and thereafter distilling the mixture to obtain hydrogen fluoride free from sulfur dioxide.

6. A process for eliminating sulfur dioxide from anhydrous hydrogen fluoride containing a small amount of the said sulfur dioxide as an impurity which comprises contacting the hydrogen fluoride in the liquid phase at a temperature between 20° and 200° C. with an amount of potassium permanganate at least stoichiometrically equivalent to the amount of sulfur dioxide originally present in the hydrogen fluoride, until the sulfur dioxide is completely oxidized, and thereafter distilling the mixture to obtain hydrogen fluoride free from sulfur dioxide.

References Cited in the file of this patent

"A Comprehensive Treatise on Inorganic and Theoretical Chemistry," by J. W. Mellor, vol. II, 1922 ed., page 133. Longmans, Green and Co., New York.

J. W. Mellor's "Inorganic and Theoretical Chem.," vol. 12, pp. 254, 255. Longmans, Green and Co., New York.

J. W. Mellor's "Inorganic and Theoretical Chem.," vol. 2, pages 131, 132. Longmans, Green and Co., New York.